(12) United States Patent
Feldmann et al.

(10) Patent No.: US 9,327,329 B2
(45) Date of Patent: May 3, 2016

(54) ROLLING TOOL DEVICE

(75) Inventors: Goetz G. Feldmann, Obgerursel (DE);
Karsten Roettger, Celle (DE); Stefan Zenk, Aller (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 230 days.

(21) Appl. No.: 13/823,703

(22) PCT Filed: Apr. 12, 2012

(86) PCT No.: PCT/EP2012/056614
§ 371 (c)(1),
(2), (4) Date: May 17, 2013

(87) PCT Pub. No.: WO2012/140104
PCT Pub. Date: Oct. 18, 2012

(65) Prior Publication Data
US 2013/0219982 A1    Aug. 29, 2013

(30) Foreign Application Priority Data

Apr. 12, 2011    (DE) .......................... 10 2011 007 223

(51) Int. Cl.
| | |
|---|---|
| *B21D 5/00* | (2006.01) |
| *B23P 9/02* | (2006.01) |
| *B24B 39/04* | (2006.01) |
| *C21D 7/08* | (2006.01) |
| *F01D 5/00* | (2006.01) |

(52) U.S. Cl.
CPC ... *B21D 5/00* (2013.01); *B23P 9/02* (2013.01); *B24B 39/04* (2013.01); *C21D 7/08* (2013.01);
(Continued)

(58) Field of Classification Search
CPC ............... B23P 9/00; B23P 9/02; B23P 9/04;
C21D 7/08; C21D 7/02; C21D 7/04; F05D 2230/26; B21B 27/03; B21B 27/021; B21B 31/14; B21H 7/16; B24B 39/04; B21D 5/00; B21D 5/14; B21D 7/00; B21D 7/08; B21D 7/06; B21D 7/063
See application file for complete search history.

(56) References Cited

U.S. PATENT DOCUMENTS 7,089,773 B2 * 8/2006 Paulsen et al. .................. 72/303
7,600,404 B2 * 10/2009 Prevey, III ........................ 72/75
(Continued)

FOREIGN PATENT DOCUMENTS

WO    2007055864    5/2007

OTHER PUBLICATIONS

German Search Report dated Sep. 12, 2011 from counterpart application.
(Continued)

*Primary Examiner* — Shelley Self
*Assistant Examiner* — Pradeep C Battula
(74) *Attorney, Agent, or Firm* — Timothy J. Klima; Shuttleworth & Ingersoll, PLC

(57) ABSTRACT

The present invention describes a rolling tool device for compression rolling of, in particular, blade elements of a rotor area of a jet engine provided with a tool carrier. The tool carrier is connectable to a carrier spindle. Furthermore, two pliers-type bodies are rotatably connected to the tool carrier. The pliers-type bodies are each provided with a rolling area, with a distance between the rolling areas being variable in dependence of the rotary movement of the pliers-type bodies. In accordance with the present invention, an axis of the carrier spindle in the state connected to the tool carrier passes between the rolling areas through a contact point present at a distance between the rolling areas equal to zero.

15 Claims, 4 Drawing Sheets

Figure 1:
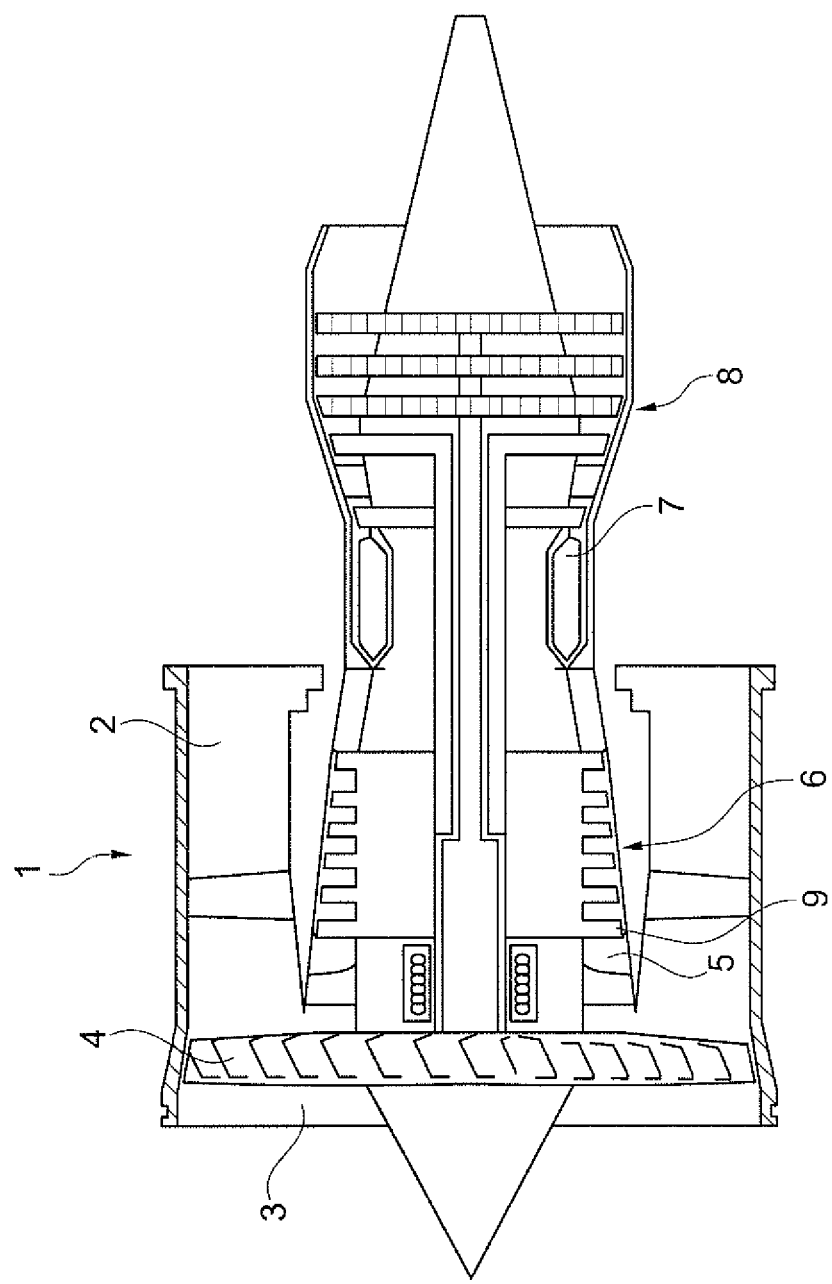

(52) U.S. Cl.
CPC ............ *F01D 5/005* (2013.01); *F05D 2230/26* (2013.01); *Y02T 50/671* (2013.01); *Y02T 50/673* (2013.01)

(56) References Cited

U.S. PATENT DOCUMENTS

| | | | |
|---|---|---|---|
| 8,408,036 B2* | 4/2013 | Reith | 72/21.4 |
| 2007/0234772 A1 | 10/2007 | Prevey | |
| 2010/0221118 A1 | 9/2010 | Prevey | |

OTHER PUBLICATIONS

International Search Report dated Jul. 19, 2012 from counterpart application.

English Translation of the International Search Report dated Jul. 19, 2012 from counterpart International Application No. PCT/EP20121058614.

* cited by examiner

ROLLING TOOL DEVICE

This application is the National Phase of International Application PCT/EP2012/056614 filed Apr. 12, 2012 which designated the U.S.

This application claims priority to German Patent Application No. DE102011007223.3 filed Apr. 12, 2011 and PCT Application No. PCT/EP2012/056614 filed Apr. 12, 2012, which applications are incorporated by reference herein.

This invention relates to a rolling tool device.

Commonly known rolling tool devices for compression rolling of, in particular, blade elements of a rotor area of a jet engine are usually provided with a tool carrier which is connectable to a carrier spindle and to which two pliers-type bodies are rotatably connected. The pliers-type bodies are each provided with a rolling area, with a distance between the rolling areas being variable in dependence of the rotary movement of the pliers-type bodies relative to the tool carrier. Such rolling tool devices, or pliers-type tools, enable blade elements, or thin-walled components, to be processed simultaneously from both sides by smooth rolling or compression rolling, respectively.

Blade elements are resolidified by compression rolling in order to enhance their resistance to foreign object damage and also vibratory loading by applying the rolling tool devices axially from the blade leading edge over the surfaces in flow direction.

The commonly known rolling tool devices are however disadvantageous in that an axis of the carrier spindle, in the state connected to the tool carrier, shows an offset to a contact axis passing through a contact point between the rolling, areas and the component to be processed, such as a blade element, as a result of which CAD-CAM programming, in particular, and subsequent implementation of the manufacturing programs on a multi-axes machining center by means of a post processor require high effort and investment, increasing manufacturing costs in an undesirable manner. The complexity involved with the axis offset between the spindle carrier axis and the contact axis passing through the contact point between the rolling areas and the component to be processed arises from the permanently changing position of the contact point relative to the spindle carrier axis as the rolling tool device is swiveled by the carrier spindle during processing of free-form surfaces of the component, a circumstance which is to be accounted for in programming the production process by appropriate adjustment of the permanently changing vectors.

The present invention, in a broad aspect, provides a rolling tool device, which keeps the expenditure for programming and subsequent implementation of manufacturing programs on multi-axes machining centers as low as possible.

The rolling tool device according to the present invention for compression rolling of, in particular, blade elements of a rotor area of a jet engine is provided with a tool carrier, which is connectable to a carrier spindle and to which two pliers-type bodies are rotatably connected. The pliers-type bodies are each provided with a rolling area and a distance between the rolling areas is variable in dependence of the rotary movement of the pliers-type bodies.

In order to facilitate programming and subsequent implementation of the manufacturing programs on multi-axes machining centers as compared to rolling tool devices known from practical applications, with the rolling tool device according to the present invention being connected to the tool carrier, an axis of the carrier spindle passes between the rolling areas through a contact point present at a distance between the rolling areas equal to zero, by which the axis of the carrier spindle and a contact line between the rolling tool device and a component to be processed are essentially congruent. Thus, in particular during the processing of free-form surfaces of a workpiece, alternating positional changes and permanently changing vectors resulting therefrom need not be taken into account when programming the production process.

In an advantageous embodiment of the rolling tool device according to the present invention, the pliers-type bodies are rotatable relative to the tool carrier about a joint rotating bearing, with a distance between the rolling areas remaining constant during rotary movement of the pliers-type bodies about the joint rotating bearing. This ensures that—upon contact of the rolling areas with a preferably thin-walled component, such as a blade element of a rotor area of a jet engine—distortion of the component to be processed due to contact of the rolling areas is avoided. Additionally, the joint rotatability of the pliers-type bodies, and thus the rolling areas, enables areas of a free-form surface to be approached which would not be reachable without the joint rotatability of the pliers-type bodies.

If the pliers-type bodies are operatively connected to the tool carrier via piston elements by means of which the pliers-type bodies are rotatable relative to the tool carrier about the rotating bearing to a zero position defined relative to the tool carrier, the rolling tool device can be operated with low control effort since the zero position of the pliers-type bodies in each case is automatedly set relative to the tool carrier.

On an embodiment of the rolling tool device according to the present invention which likewise can be operated with low control effort, the pliers-type bodies are coupled to each other via a driving unit and the distance between the rolling areas is reducible in dependence of a driving unit-side rotary movement of the pliers-type bodies relative to each other.

On a simply designed and cost-effective embodiment of the rolling tool device according to the present invention, the driving unit is provided as single-acting piston-cylinder unit.

If a resetting device is associated to the pliers-type bodies, through which the latter are rotated relative to each other to enable a distance between the rolling areas to be changed to a maximum value, engagement between the rolling areas of the rolling tool device and the respective component to be processed can be dispensed with as desired.

If the rolling areas are connectable to the pliers-type bodies by means of adapter elements, the rolling tool device provides that, via differently conceived adapter elements, preferably different radial engagement depths and also different rolling forces for the respective component to be processed are implementable with low design effort in a cost-effective manner.

If the rolling areas include a ball element each, point contact exists between the rolling areas and the respective component to be processed, by which high surface pressure is attainable with relatively low forces and, thus, high residual stress, with at the same time high surface finish, is impartable to surface-near areas of the component to be processed.

If a distance between the rolling areas is reducible to a defined limit value via the driving unit, it is ensured in a simple manner that the rolling areas will not come into contact with each other even if a maximum travel is reached and, again in a simple manner, damage to the rolling tool device will be avoided.

Both the features cited in the patent Claims and the features specified in the following exemplary embodiment of the rolling tool device in accordance with the present invention are, alone or in any combination, capable of further developing the subject matter of the present invention. The respective combinations of features are in no way limiting the development of the subject matter of the present invention, but essentially have only exemplary character.

Figure 3:
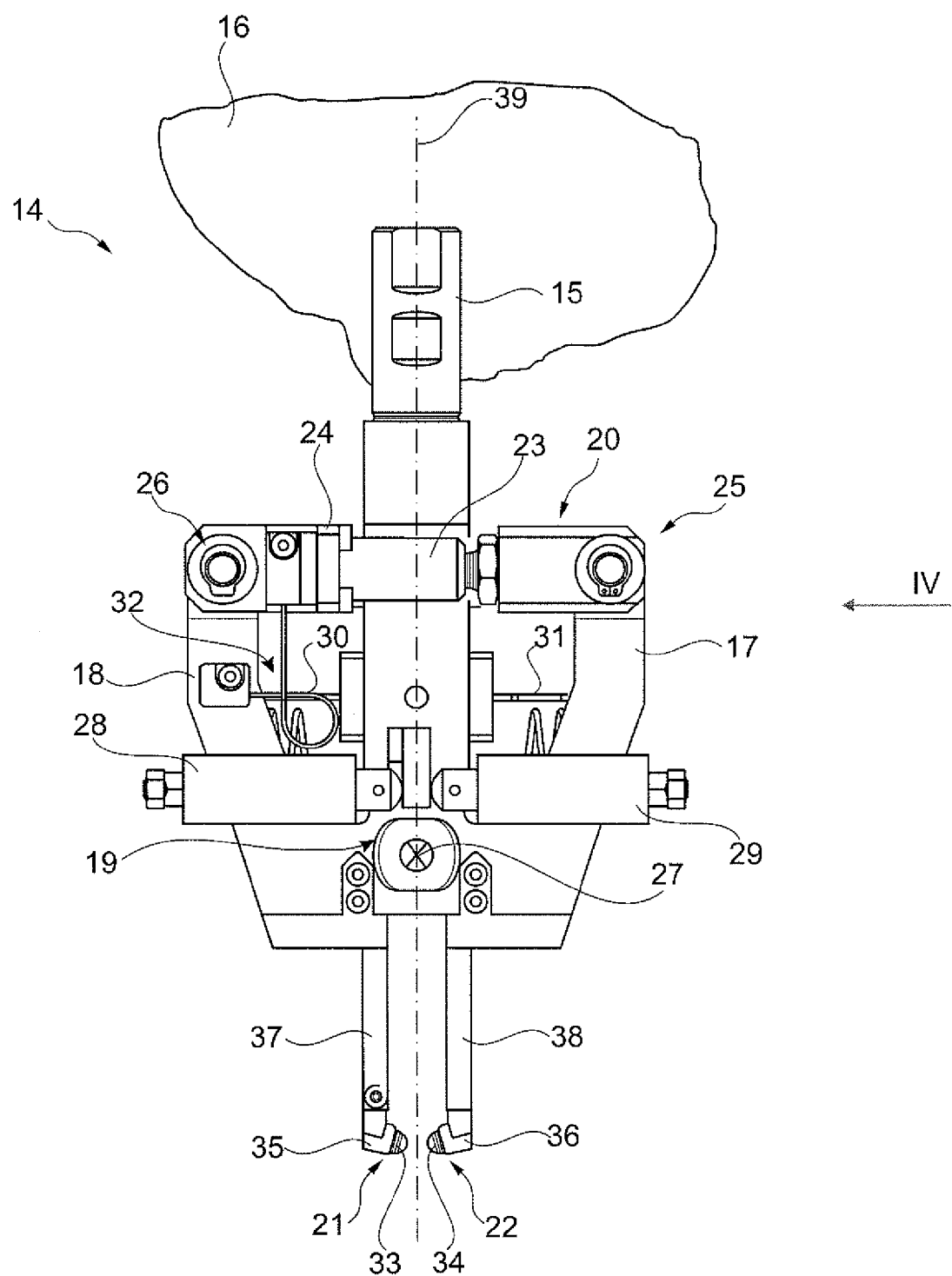
Figure 4:
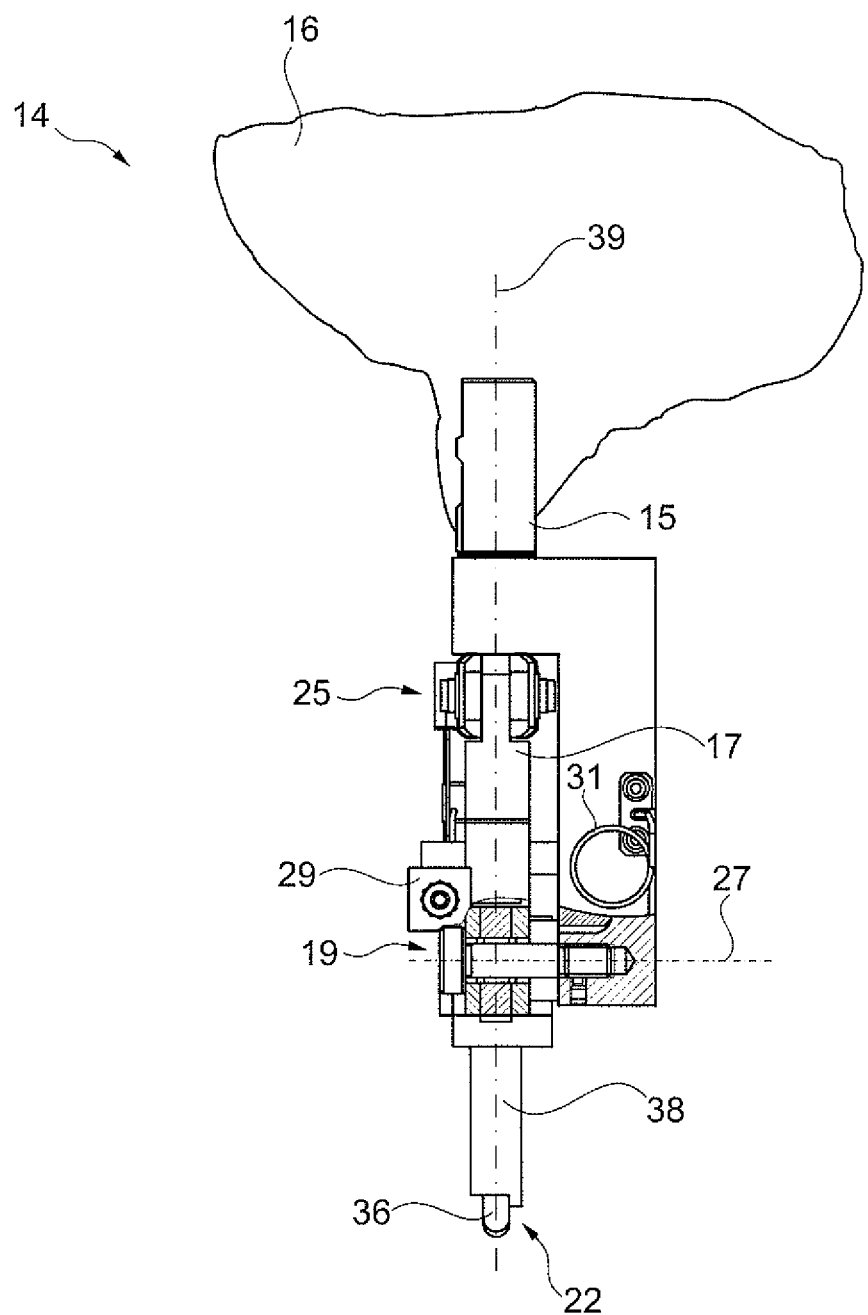

Further advantages and advantageous embodiments of the subject matter of the present invention become apparent from the patent Claims and the exemplary embodiment schematically described in the following with reference to the accompanying drawing. In the drawing, FIG. 1 shows a highly schematized longitudinal sectional view of a jet engine provided with a one-piece rotor area, FIG. 2 is an enlarged individual representation of a blade element of the one-piece rotor area as per FIG. 1, FIG. 3 is a side view of a roving tool device, and FIG. 4 shows the rolling tool device as per FIG. 3 in a view V represented in more detail in FIG. 3.

FIG. 1 shows a longitudinal sectional view of a jet engine 1 provided with a bypass duct 2. The jet engine 1 is further provided with an inlet area 3 downstream of which a fan 4 is arranged in known manner. Again downstream of the fan 4, the fluid flow in the jet engine 1 divides into a bypass flow and a core flow, with the bypass flow passing through the bypass duct 2 and the core flow into an engine core 5 which, again in known manner, is provided with a compressor arrangement 6, a burner 7 and a turbine arrangement 8.

Figure 2:
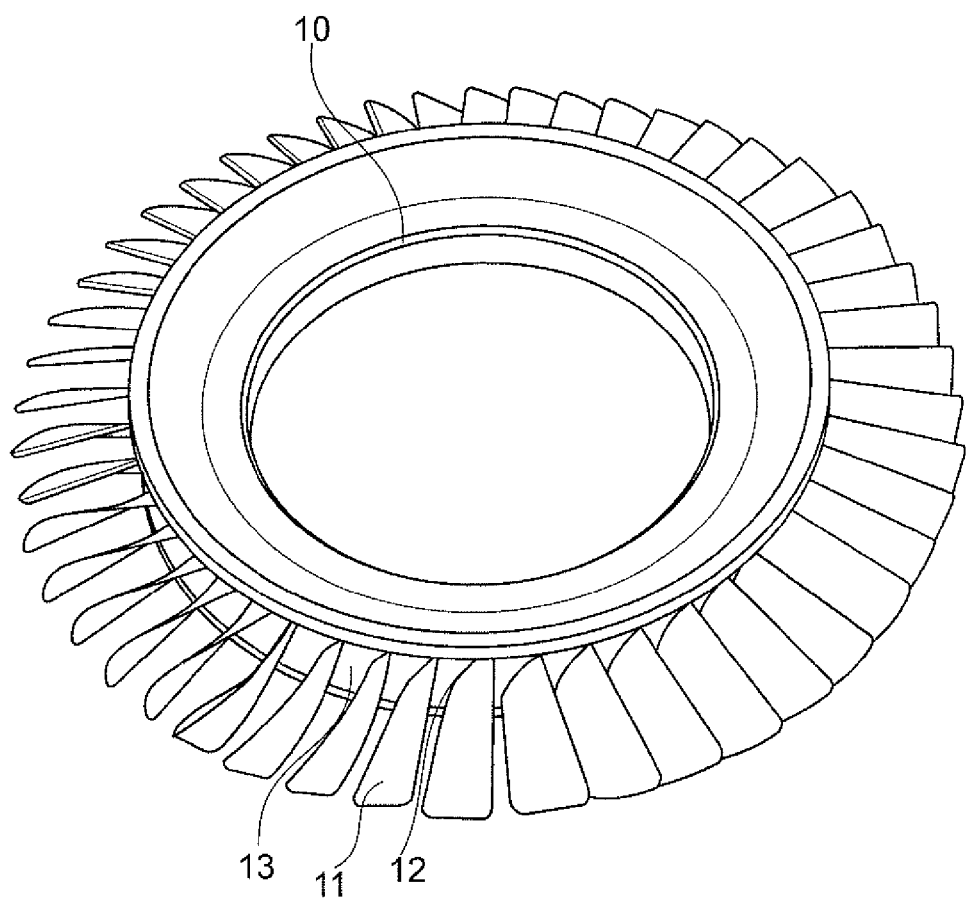

FIG. 2 shows an enlarged individual view of a one-piece rotor area 9 of the compressor arrangement 6 including an annular base body 10 and several circumferentially distributed blade elements 11 extending essentially radially from the base body 10.

The one-piece rotor area 9 is a so-called blisk, i.e. an integrally bladed rotor design. The term blisk is composed of the words "blade" and "disk". The disk or, respectively, the annular base body 10 and the blade elements 11 are made in one-piece, removing the need for blade roots and disk slots provided on multi-piece rotor areas. The one-piece rotor area 9 is distinct from conventionally bladed compressor rotors by a significant decrease in the number of components and the disk shape of the annular base body 10 is designed for lower rim loads. In combination with the use of lighter materials, this results in a weight saving of the one-piece rotor area 9 of up to 50 percent compared to conventional rotor areas. The amount of weight saving is in each case dependent on the geometry of the compressor arrangement 6.

A further positive effect is that the blade elements 11 of the integrally bladed rotor area 9 are spaceable more closely to each other, thereby enabling best possible compression and enhancement of efficiency.

In order to provide the compressor arrangement 6 or, respectively, the one-piece rotor area 9 with resistance to foreign object damage and also vibratory loading while at the same time keeping the weight low, residual stresses are imparted to the blade elements 11 in surface-near areas by way of roller compression using a rolling tool device 14 or a rolling tool, respectively, radially engaging in each case between the blade elements 11 and further shown in FIGS. 3 and 4, with the entire surface of each blade element 11 being roller-compressed in each case. Additionally, the transition areas 12, or fillets, respectively, between the surfaces of the blade elements 11 and a surface 13 of the base body 10 between the blade elements 11 are also roller-compressed by means of a so-called one-finger rolling tool not further shown in the drawing.

Furthermore, the surface 13 or, respectively, the annulus of the base body 10 between the blade elements 11 is preferably also roller-compressed by means of a one-finger rolling tool.

Roller-compressing the surfaces of the longitudinal sides and the edges of the blade elements 11, the transition areas 12 and the surface 13 of the base body 10 in each case solidifies surface-near areas of the one-piece rotor area 9 by increasing dislocation density and hardens the surface layer of the rotor area 9. Hardening the surface layer reduces the risk of cracking resulting from foreign object damage and vibratory loading. Moreover, the residual compressive stresses imparted by roller compression to the material in the area of the rotor area 9 counteract crack propagation after crack formation, thereby positively influencing fatigue strength and, thus, the service life of the jet engine 1.

Furthermore, roller compression provides the one-piece rotor area 9 with high surface finish and low surface roughness, thereby positively influencing the aerodynamic quality of the blade elements 11 and the entire rotor area 9 without the need for a further surface smoothening process to be performed subsequently to the solidification process.

FIG. 3 and FIG. 4 each show a side view of a rolling tool 14 for roller-compressing the longitudinal sides or, respectively, the entire surface of the blade elements 11 of the rotor area 9. The rolling tool 14 includes a tool carrier 15, which can be connected to a carrier spindle 16 of a machine tool to the extent shown. Two pliers-type bodies (lever arms) 17, 18 of the rolling tool 14 are rotatably connected to the tool carrier 15 in the area of a rotating bearing 19, with the pliers-type bodies 17, 18 being coupled via a driving unit 20 provided here as single-acting piston-cylinder unit and a distance between rolling areas 21, 22 being reduced in dependence of a driving unit-side rotary movement of the pliers-type bodies 17 and 18 about the rotating bearing 19. For this, the driving unit 20 is subject to hydraulic pressure and, under the action thereof, a piston element 23 is extended from a cylinder element 24 of the driving unit 20, with a distance between the ends 25 and 26 of the pliers-type bodies 17 and 18 facing away from the rolling areas 21 and 22 being increased during such a change of the operating state of the driving unit 20, while the distance between the rolling areas 21 and 22 is decreased according to the geometric situation in dependence of the rotary movement of the pliers-type bodies 17 and 18 about the rotating bearing 19. The pliers-type bodies 17 and 18 are each rotatably connected to the driving unit 20 in the area of their ends 25 and 26.

Furthermore, the two pliers-type bodies 17 and 18 are additionally rotatably attached to the tool carrier 15 around the rotating bearing 19 about a rotary axis 27 vertically aligned to the drawing plane to enable the pliers-type bodies 17 and 18 to be swiveled upon contact of the rolling areas 21 and 22 with a blade element 11 and avoid distortion of the blade elements 11 resulting from the contact of the rolling areas 21 and 22 with the blade element. During joint rotation of the pliers-type bodies 17 and 18 around the rotating bearing 19 relative to the tool carrier 15, the distance between the rolling areas 21 and 22 remains constant. Joint rotatability of the two pliers-type bodies 17 and 18 around the rotating bearing 19 further ensures that the blade elements 11, each of which being provided with a blade profile are roller-compressible on their entire surface using the rolling tool 14.

The pliers-type bodies 17 and 18 are operatively connected to the tool carrier 15 via piston elements 28 and 29, with the piston elements 28 and 29 resetting the pliers-type bodies 17 and 18 relative to the tool carrier 15 around the rotating bearing 19 to a zero position defined relative to the tool carrier 15 and shown in FIG. 3 when a rotating force jointly rotating the pliers-type bodies 17 and 18 around the rotating bearing 19 is essentially zero.

Furthermore, a resetting device 32, here including two spring-action devices 30 and 31, is associated to the pliers-type bodies 17 and 18 through which the latter (17 and 18) are rotated to enable a distance between the rolling areas 21 and 22 to be changed to a maximum value.

Each of the rolling areas 21 and 22 here includes a ball element 33, 34 retained in holding areas each and subjectable to hydraulic pressure in known manner to enable the rolling pressure required in each case to be applied to the blade elements 11 via the ball elements 33 and 34.

The holding areas 35 and 36 are here inserted into, and threadedly connected, preferably by means of grub screws, to adapter elements 37 and 38 which are firmly threadedly connected to the pliers-type bodies 17 and 18 and are at least approximately finger-shaped.

Each of the adapter elements 37 and 38 is changeable so that the rolling tool 14 provides for various engagement depths in the radial direction between the blade elements 11. Moreover, adapter elements 37 and 38 designed with respect to the transmittable pressure or rolling force, respectively, are connectable to the pliers-type bodies 17 and 18, with thinner adapter elements being insertable into narrower areas between the blade elements 11. Here, lower rolling or pressure forces, respectively, are applied to thinner blade elements 11 with more slender adapter elements 37 and 38, with the adapter elements 37 and 38 then having a certain elasticity and the maximum rolling force being limited by the elasticity of the adapter elements 37 and 38. Full solidification of the blade elements during compression rolling is avoidable by limiting the maximum rolling force, with excessive pressure loading during roller compression producing a tensile stress maximum in the center area of the blade elements 11 which promotes internal crack formation under vibratory loading. This, however, is undesirable as it affects the service life of the blade elements 11.

The rolling force imparted in each case to the rotor area during roller compression is variable at each location of a blade element 11 and also in the transition areas 12 and the remaining surface 13 of the base body 10 by controlling the hydraulic pressure applied to the rolling areas 21, 22 via a pressure control unit not further shown in the drawing, thereby enabling the rotor area 9 to be solidified to the desired extent by producing the optimum residual compressive stresses required at each location of the rotor area 9 and an improvement to be obtained with regard to the durability of the blades.

In order to facilitate, for example, CAD-CAM programming upstream of a roller compression process using the rolling tool 14 and subsequent implementation of the manufacturing programs on a multi-axes machining center by means of a post processor, an axis 39 of the carrier spindle 16 in the operating state connected to the tool carrier 15 passes between the rolling areas 21 and 22 through a contact point present at a distance between the rolling areas 21 and 22 equal to zero. Thus, the axis or the spindle carrier axis 392, respectively, and an axis through the contact point between the rolling areas 21 and 22 are congruent, thereby substantially facilitating programming of the rolling process.

In order to avoid damage to the blade elements 11 to be processed and to the rolling tool 14 proper, a distance between the rolling areas 21 and 22 is reducible via the drive unit 20 no further than to a defined limit value. Since the two ball elements 33 and 34 cannot be brought into contact with each other by respective turning or swiveling of the pliers-type bodies 17 and 18 and, thus, the adapter elements 37 and 38, damage to the rolling tool 14 is prevented in a simple manner.

The rolling tool 14 enables integrally bladed disks and rotors of jet engines to be roller-compressed at low cost. The rapid and easy exchange of the adapter elements 37 and 38 qualifies the rolling tool 14 with low setup times for use with rotor areas having different geometry, with different engagement depths between blade elements as well as different processing forces during the rolling process being representable on differently conceived components with high safety and process capability.

The pliers-type design of the rolling tool 14 enables blade elements or airfoils, respectively, of one-piece rotor areas to be processed from the tip to the fillet, with simultaneous roller compression of the pressure and suction sides of blade elements being provided to avoid distortion due to residual stress.

In addition, various individual tools enable the fillets or the transition areas, respectively, between the surface of the blade elements and the surface of the base body between the blade elements on the suction and pressure side to be processed to the desired extent. Moreover, the surface of the base body between the blade elements or the annulus, respectively, is roller-compressible by means of individual tools.

Basically, the rolling tool 14 can be integrated into any known machining center. In contrast to resolidification by shot peening, there is no need to procure expensive facilities. The rolling tool 14 enables resolidification to be performed, for example, in conventional milling centers. The milling centers are equipped with the rolling tool 14 and the one-piece rotor areas are processed using the rolling tool 14 in the area of their surfaces analogically to milling.

LIST OF REFERENCE NUMERALS

1 Jet engine
2 Bypass duct
3 Inlet area
4 Fan
5 Engine core
6 Compressor arrangement
7 Burner
8 Turbine arrangement
9 One-piece rotor area
10 Annular base body
11 Blade element
12 Transition area
13 Surface of the base body
14 Rolling tool
15 Tool carrier
16 Carrier spindle
17, 18 Pliers-type body
19 Rotating bearing
20 Driving unit
21, 22 Rolling area
23 Piston element
24 Cylinder element
25 End of pliers-type body 17
26 End of pliers-type body 18
27 Rotary axis
28, 29 Piston element
30, 31 Spring-action device
32 Resetting device
33, 34 Ball element
35, 36 Holding area
37, 38 Adapter element
39 Axis

What is claimed is:
1. A rolling tool device for compression rolling of blade elements of a rotor area of a jet engine, comprising:
   a tool carrier which is connectable to a carrier spindle of a machine tool;

a pliers mechanism including two lever arms connected to the tool carrier to be rotatable with respect to each other;

a rolling area connected to each lever arm, with a distance between the two rolling areas being variable in dependence on rotary movement of the lever arms;

wherein, the rolling tool is configured such that in a state where the tool carrier is connected to the carrier spindle, an axis of the carrier spindle passes between the two rolling areas through a contact point of the two rolling areas when a distance between the rolling areas is equal to zero;

a joint rotating bearing connected to the tool carrier, with the lever arms being rotatable relative to the tool carrier about the joint rotating bearing, and with the distance between the rolling areas remaining constant during rotary movement of the lever arms about the joint rotating bearing.

2. The rolling tool device in accordance with claim 1, and further comprising a piston operating between the lever arms for rotating the lever arms relative to the tool carrier about the rotating bearing to a zero position defined relative to the tool carrier.

3. The rolling tool device in accordance with claim 1, and further comprising a driving unit coupled to the pliers mechanism for rotating the lever arms relative to each other to alter a distance between the rolling areas.

4. The rolling tool device in accordance with claim 3, wherein the driving unit includes a single-acting piston-cylinder unit.

5. The rolling tool device in accordance with claim 4, and further comprising a resetting device associated with the lever arms for rotating the lever arms relative to each other to increase a distance between the rolling areas to a maximum value.

6. The rolling tool device in accordance with claim 5, and further comprising adapter elements connecting the rolling areas to the lever arms.

7. The rolling tool device in accordance with claim 6, wherein the rolling areas each include a ball element.

8. The rolling tool device in accordance with claim 7, wherein the driving unit limits a minimum distance between the rolling areas to a defined limit value.

9. The rolling tool device in accordance with claim 3, wherein the driving unit limits a minimum distance between the rolling areas to a defined limit value.

10. The rolling tool device in accordance claim 1, and further comprising a resetting device associated with the lever arms for rotating the lever arms relative to each other to increase a distance between the rolling areas to a maximum value.

11. The rolling tool device in accordance with claim 10, and further comprising adapter elements connecting the rolling areas to the lever arms.

12. The rolling tool device in accordance with claim 11, wherein the rolling areas each include a ball element.

13. The rolling tool device in accordance with claim 1, and further comprising adapter elements connecting the rolling areas to the lever arms.

14. The rolling tool device in accordance with claim 1, wherein the rolling areas each include a ball element.

15. The rolling tool device in accordance claim 1, and further comprising a spring associated with at least one of the lever arms for rotating the lever arms relative to each other to increase a distance between the rolling areas.

* * * * *